United States Patent [19]
Kawade et al.

[11] Patent Number: 5,264,876
[45] Date of Patent: Nov. 23, 1993

[54] RECORDING MEDIUM, METHOD FOR PREPARING THE SAME, RECORDING AND REPRODUCING DEVICE, AND RECORDING, REPRODUCING AND ERASING METHOD BY USE OF SUCH RECORDING MEDIUM

[75] Inventors: Hisaaki Kawade, Atsugi; Hiroshi Matsuda, Isehara; Yuko Morikawa, Kawasaki, all of Japan

[73] Assignee: Canon Kabushiki Kaisha, Tokyo, Japan

[21] Appl. No.: 5,466

[22] Filed: Jan. 19, 1993

Related U.S. Application Data

[62] Division of Ser. No. 564,080, Aug. 8, 1990, Pat. No. 5,206,665.

[30] Foreign Application Priority Data

Aug. 10, 1989 [JP] Japan ................................. 1-205763
Aug. 10, 1989 [JP] Japan ................................. 1-205769
Aug. 10, 1989 [JP] Japan ................................. 1-205771

[51] Int. Cl.$^5$ ............................................. B41J 2/385
[52] U.S. Cl. ............................................. 346/153.1
[58] Field of Search .................. 346/108, 135.1, 76 L, 346/150, 153.1, 154, 155

[56] References Cited

U.S. PATENT DOCUMENTS

| | | | |
|---|---|---|---|
| 4,819,210 | 4/1989 | Miura et al. | 365/106 |
| 4,939,556 | 7/1990 | Eguchi et al. | 357/4 |
| 4,943,471 | 7/1990 | Uekita et al. | 428/220 |
| 5,075,738 | 12/1991 | Matsuda et al. | 357/6 |
| 5,206,665 | 4/1993 | Kawade et al. | 346/135.1 |

*Primary Examiner*—Mark J. Reinhart
*Attorney, Agent, or Firm*—Fitzpatrick, Cella, Harper & Scinto

[57] ABSTRACT

The present invention provides a recording medium comprising a recording layer on an electrode substrate and one or a plural number of fine lone electrode made of an electroconductive material provided on said recording layer.

39 Claims, 8 Drawing Sheets

SCANNING IN X-DIRECTION

RECORDING MEDIUM, METHOD FOR PREPARING THE SAME, RECORDING AND REPRODUCING DEVICE, AND RECORDING, REPRODUCING AND ERASING METHOD BY USE OF SUCH RECORDING MEDIUM

This application is a division of application Ser. No. 07/564,080 filed Aug. 8, 1990 now U.S. Pat. No. 5,206,665.

BACKGROUND OF THE INVENTION

1. Field of the Invention

This invention relates to a recording medium to be used for the system which performs recording, reproduction and erasing of information by use of a probe electrode, and a method for preparing the same.

Also, the present invention relates to a recording and reproducing device and a recording, reproducing and erasing method by use of such recording medium.

2. Related Background Art

In recent years, uses of memory materials form the nucleus of electronics industries such as computers and their related instruments, video discs, digital audio discs, etc. and developments of their materials are also under active progress. The performances demanded for memory materials may differ depending on uses, but may generally include:

(1) high density and large recording capacity;
(2) rapid response speed of recording and reproduction;
(3) excellent stability;
(4) little error rate;
(5) small power consumption;
(6) high productivity and low cost; etc.

Heretofore, semiconductor memories or magnetic memories employing magnetic material or semiconductor as the base material have been predominant, but with the advancement of laser technique, inexpensive and high density recording media with optical memory by use of an organic thin film such as organic dye, photopolymer, etc. are now emerging in the field of art.

However, in the case of an optical memory by use of an organic thin film as the recording layer, in spite of such advantages that the cost is very low because an organic material is employed and also that the density is high because a laser beam is employed for recording and reproduction, particularly light fastness is inferior because a material reactive with light (particularly UV-ray) is employed as the recording layer, whereby a problem has been involved in stability. Also, for improvement of light fastness, there may be employed the method of mixing a UV-absorber with the organic material itself, or covering the recording layer with a UV-absorbing film, but in this case, the reactivity with light becomes contrariwise poor, whereby recording sensitivity is inferior. As the result, should, for example, writing and reproduction be performed with the same recording power as usual, there was involved the problem that the error rate became larger. Thus, in the case of an optical memory which performs recording and reproduction by use of light, in its characteristics, there has been involved the problem that light fastness, namely stability, is poor, or that error rate becomes poor.

As different from optical recording, a recording and reproducing device which performs writing and reading of information by use of a probe electrode onto a recording medium comprising an organic thin film for the recording layer is disclosed in Japanese Patent Laid-Open Nos. 63-161552 and 63-161553.

The recording medium disclosed in such publications, probably because the recording layer is exposed on the surface, is susceptible to deterioration (inferior in environmental resistance) due to action by light or humidity when, for example, an organic material is used as the recording layer, whereby electrical characteristics will also be readily changed.

For cancelling such inconveniences, one may also consider to provide a protective layer on the recording layer surface.

However, to be used for the system which performs reproduction of recording by detection of the current value flowing between the recording medium and the probe electrode, the protective layer is required to be made sufficiently thin, but if the thickness is made thin, there is contrariwise the drawback that the layer will not function as the protective layer.

Also, in the prior art example, it will take a long time for fine control of the distance between the recording medium surface and the probe electrode, and also it is not easy to maintain always the distance constantly, whereby the current-voltage characteristics are liable to become unstable.

SUMMARY OF THE INVENTION

Accordingly, an object of the present invention is to provide a recording medium which is excellent in environmental resistance, particularly light fastness, even an organic thin film may be employed for the recording layer, can effect stable recording and reproduction, and a method for preparing the same.

Another object of the present invention is to provide a recording and reproducing device and a recording, reproducing and erasing method which have improved stabilization of recording and reproduction to make access to the recording site easier.

The above-mentioned objects can be accomplished by the present invention as mentioned below.

The first embodiment of the present invention is a recording medium comprising a recording layer on an electrode substrate and one or a plural number of fine lone electrode made of an electroconductive material provided on said recording layer.

The second embodiment of the present invention is a method for preparing a recording medium, which comprises forming a recording layer on an electrode substrate and forming one or a plural number of fine lone electrode made of an electroconductive material by use of the lithographic method.

The third embodiment of the present invention is a method for preparing a recording medium comprising the steps of:

forming a first electrode layer by depositing an electroconductive material on a substrate;

forming a recording layer comprising a monomolecular film or built-up monomolecular films of an organic compound according to the Langmuir-Blodgett method on said electrode layer;

forming a second electrode layer by forming an electroconductive material on said recording layer; and forming a fine lone electrode from the second electrode layer via coating of a resist material on said electrode layer, exposure and development.

The fourth embodiment of the present invention is a method for preparing a recording medium comprising the steps of:

forming a first electrode layer by depositing an electroconductive material on a substrate;

forming a recording layer comprising a monomolecular film or built-up monomolecular films of an organic compound according to the Langmuir-Blodgett method on said electrode layer;

forming a second electrode layer by forming an electroconductive material on said recording layer;

initializing the recording layer by application of a voltage between said first electrode layer and second electrode layer; and forming a fine lone electrode from the second electrode layer via coating of a resist material on said electrode layer, exposure and development.

The fifth embodiment of the present invention is to provide a recording device, provided with a recording medium having a recording layer on a electrode substrate and one or a plural number of fine lone electrode made of an electroconductive material provided on said recording layer, at least one probe electrode, and a pulse voltage application circuit for recording.

The sixth embodiment of the present invention is a recording and reproducing device, provided with a recording medium having a recording layer on a electrode substrate and one or a plural number of fine lone electrode made of an electroconductive material provided on said recording layer, at least one probe electrode, a pulse voltage application circuit for recording and a bias voltage application circuit for reproduction.

The seventh embodiment of the present invention is to provide a recording and reproducing device, provided with a recording medium having a recording layer on a electrode substrate and one or a plural number of fine lone electrode made of an electroconductive material provided on said recording layer, at least one probe electrode, a pulse voltage application for recording/erasing and a bias voltage application circuit for reproduction.

The eighth embodiment of the present invention is a recording method, which comprises performing recording by accessing a probe electrode to recording medium having a recording layer on an electrode substrate and one or a plural number of fine lone electrodes made of an electroconductive material provided on said recording layer, and applying a pulse voltage from the probe electrode through the fine lone electrode on the recording medium.

The ninth method of the present invention is a recording and reproducing method, which comprises performing recording by accessing a probe electrode to recording medium having a recording layer on an electrode substrate and one or a plural number of fine lone electrodes made of an electroconductive material provided on said recording layer, and applying a pulse voltage from the probe electrode through the fine lone electrode on the recording medium, and performing reproduction of the recording by applying a bias voltage on the recording medium.

The tenth embodiment of the present invention is a recording, reproducing and erasing method, which comprises performing recording by accessing a probe electrode to recording medium having a recording layer on an electrode substrate and one or a plural number of fine lone electrodes made of an electroconductive material provided on said recording layer and applying a first pulse voltage from the probe electrode through the fine lone electrode on the recording medium, performing reproducing by applying a bias voltage on the recording medium, and further performing erasing of the recording by applying a second pulse voltage.

DESCRIPTION OF THE PREFERRED EMBODIMENTS

Figure 1:
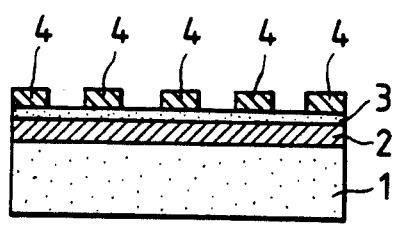
FIG. 1 is a constitutional view of the recording medium of the present invention.

FIG. 1 is an example of the constitutional view of the recording medium of the present invention. In FIG. 1, a recording layer 3 having the electrical memory effect is formed on the counter-electrode 2, and the fine lone electrodes 4 shaped in islands made of an electroconductive material are provided thereon. Due to performing electrically recording and reproduction from the probe electrode through the fine lone electrodes for such recording medium, a material having light fastness can be used for the recording layer itself, and also since the recording site is protected by coverage with fine lone electrodes, a recording medium very excellent in light fastness and stability can be provided. Also, the system for recording information at each one fine lone electrode is employed, by arranging previously the fine lone electrodes regularly as desired, it becomes also possible to perform tracking with recording bits, namely fine lone electrode themselves. Owing to this, no guide groove is required to be formed and therefore the preparation steps of the recording medium become simpler. Also, by making the size of the fine lone electrode smaller, it is also possible to make the density higher as equal to an optical disc or more.

The recording medium of the present invention, by employing an organic built-up film with molecules having a group having $\pi$-electron level and a group having only $\sigma$-electron level in combination laminated on an electrode, can exhibit a non-linear current-voltage characteristic different from the prior art by applying current through fine lone electrodes by use of a probe electrode vertical to the film surface.

Since most of organic materials generally exhibit insulating or semi-insulating properties, a remarkable diversity of applicable organic materials having a group having π-electron level are included in the present invention.

As the structure of the dye having π-electron system suitable for the present invention, there may be included, for example, dyes having porphyrin skeleton such as phthalocyanine, tetraphenylporphyrine, etc.; azulene type dyes having squarilium group and croconic methine group as the bonding chain and cyanine-like dyes having two or more nitrogen-containing heterocyclic rings such as quinoline, benzothiazole, benzoxazole, etc. bonded through squarilium group and croconic methine group; or cyanine dyes, condensed polycyclic aromatic compounds such as anthracene and pyrene, and chain compounds obtained by polymerization of aromatic ring and heterocyclic compounds; and polymers of diacetylene group; further derivatives of tetracyanoquinodimethane or tetrathiafulvalene and analogues thereof and charge transfer complexes thereof; and further metal complex compounds such as ferrocene, tris-bipyridine ruthenium complexes, etc.

As the polymeric material suitable for the present invention, for example, addition polymers such as polyacrylic acid derivatives, etc., condensation polymers such as polyimides, etc., ring-opening polymers such as nylon, etc., biopolymer such as bacteriorhodopsin, etc. may be included.

Concerning formation of an organic recording medium, although the vapor deposition method or the cluster ion beam method may be applicable, an LB method is extremely suitable among the known techniques because of controllability, easiness and reproducibility.

According to the LB method, a monomolecular film of an organic compound having a hydrophobic site and a hydrophilic site in one molecule or a build-up film thereof can be formed easily on a substrate, which has a thickness on the molecular order and a uniform and homogeneous organic ultra-thin film can be supplied stably over a large area.

The LB method is a method in which a monomolecular film or its built-up film is prepared by utilizing the phenomenon that, in a molecule with a structure having a hydrophilic site and a hydrophobic site in a molecule, when the balance of the both (amphiphilic balance) is brought to a proper value, the molecule will form a layer of monomolecule on the water surface with the hydrophilic group directed downward.

Examples of the group constituting the hydrophobic site may include various hydrophobic groups generally known widely such as saturated and unsaturated hydrocarbon groups, condensed polycyclic aromatic groups and chain polycyclic phenyl groups, etc. These may constitute the hydrophobic moiety each individually or as a combination of a plurality thereof. On the other hand, most representative as the constituent of the hydrophilic moiety are, for example, hydrophilic groups such as carboxyl group, ester group, acid amide group, imide group, hydroxyl group, further amino groups (primary, secondary, tertiary, and quaternary, etc. These also constitute the hydrophilic moiety of the above molecule each individually or as a combination of a plurality thereof.

A dye molecule having these hydrophobic group and hydrophilic group in a well-balanced state and having π-electron system having an appropriate size can form a monomolecular film on the water surface, and it can be extremely suitable material for the present invention.

Specific examples may include the molecules as shown below.

[I] Croconic methine dyes:

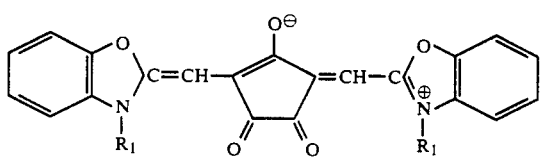

1)

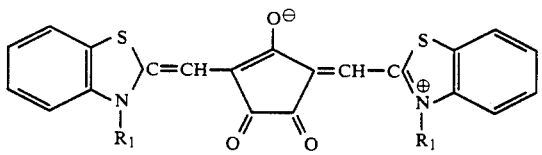

2)

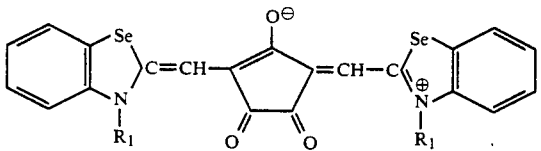

3)

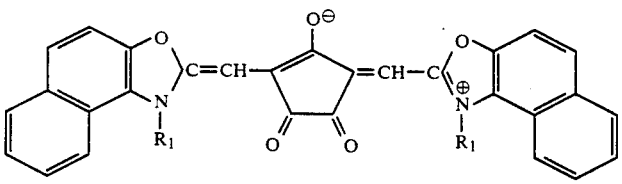

4)

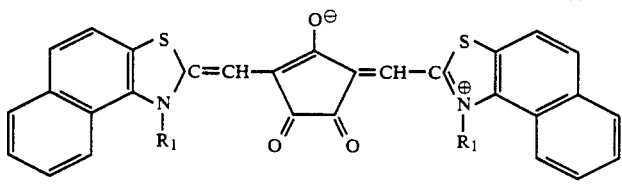
5)

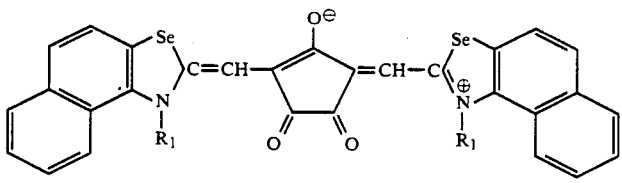
6)

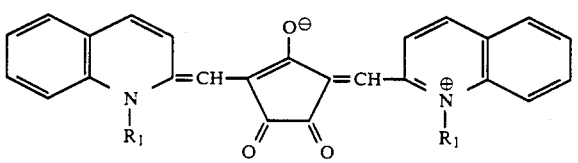
7)

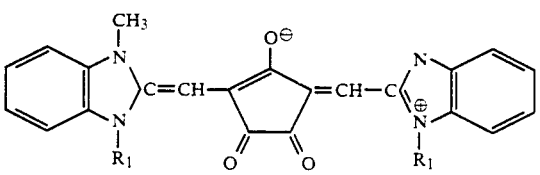
8)

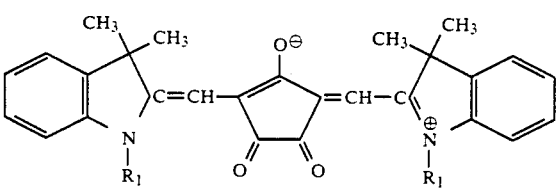
9)

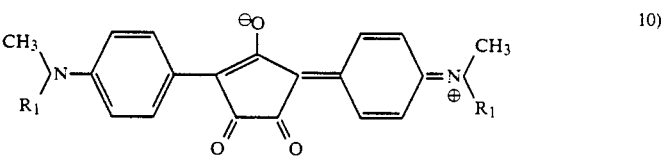
10)

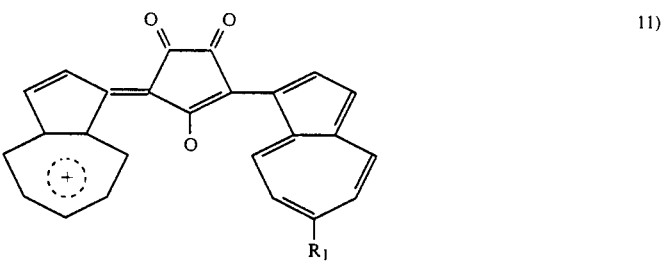
11)

wherein $R_1$ corresponds to the group having $\pi$-electron level as mentioned above, and may be preferably a long chain alkyl group introduced with the carbon number n being $5 \leq n \leq 30$ for making easier formation of the monomolecular film on the water surface. The compounds mentioned above as specific examples show only the basic structures, and various derivatives of these compounds are also suitable in the present invention, as a matter of course.

[II] Squarilium dyes:

Compounds mentioned in [I] in which the croconic methine groups are replaced with the squarilium group having the following structure:

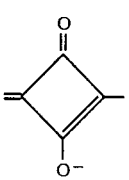

[III] Porphyrin type dye compounds:

1)

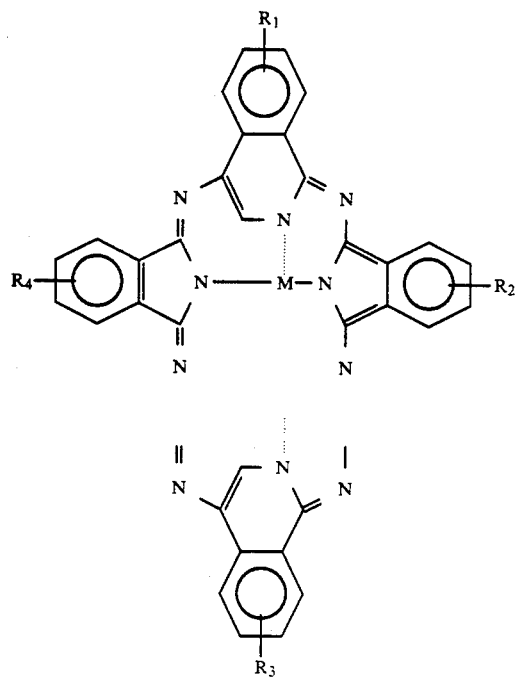

$R_1, R_2, R_3, R_4 = H$,

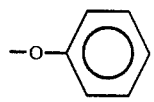

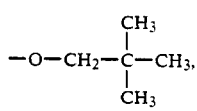

$-OC_5H_{11}$,
$-C(CH_3)_3$,
$-CH_2NHC_3H_7$
$M = H_2$, Cu, Ni, Al—Cl
and rear earth metal ion

2)

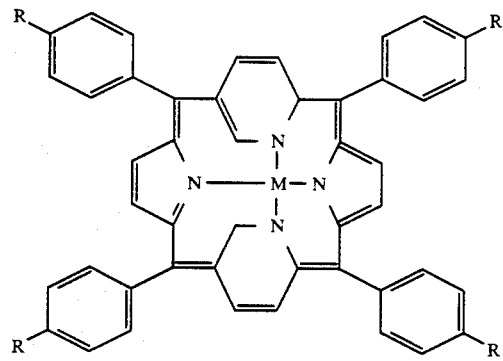

$R = OCH(COOH)C_nH_{2n+1}$
$5 \leq n \leq 25$
$M = H_2$, Cu, Ni, Zn, Al—Cl
and rear earth metal ion

3)

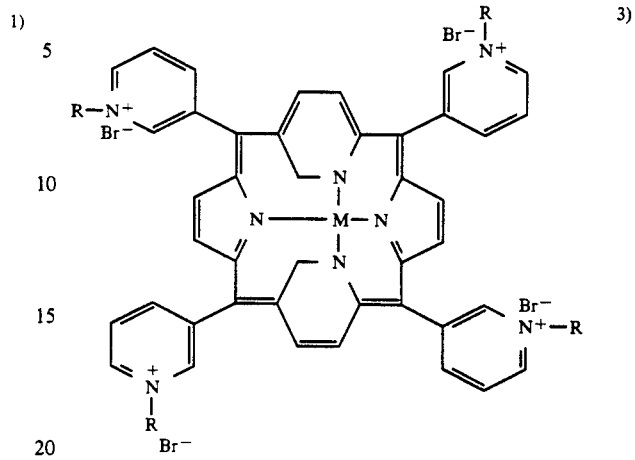

$R = C_2H_{2n+1}$  $5 \leq n \leq 25$
$M = H_2$, Cu, Ni, Zn, Al—Cl
and rear earth metal ion R is introduced for making easier formation of the monomolecular film, and is not limited to the substituents mentioned here. On the other hand, $R_1$-$R_4$ correspond to the group having σ-electron level as mentioned above.

[IV] Condensed polycyclic aromatic compounds:

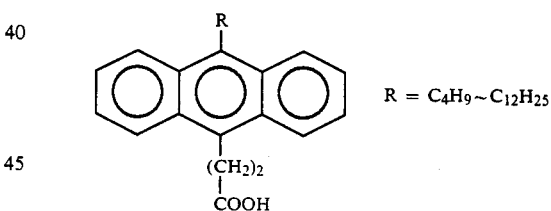

$R = C_4H_9 \sim C_{12}H_{25}$

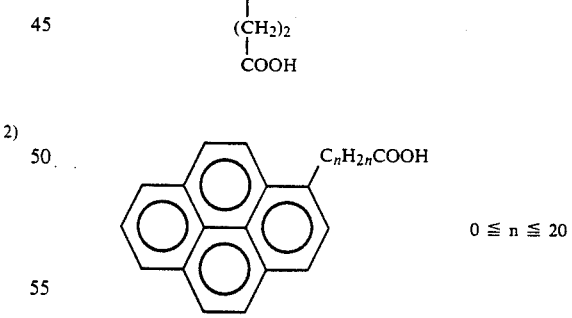

$0 \leq n \leq 20$

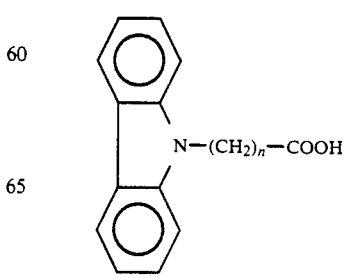

-continued

[V] Diacetylene compounds:

$$CH_3(CH_2)_{\overline{n}}C\equiv C-C\equiv C(CH_2)_m X$$
$$0 \leq n, m \leq 20$$

(with proviso $n+m>10$)

X is a hydrophyilic group, and generally —COOH is used, but —OH, —CONH$_2$, etc. can be also used.

[VI] Others:

1) Quinquethienyl

2)

3) R = CONHC$_{18}$H$_{37}$, OCOC$_{17}$H$_{35}$

4)

5)

-continued

5)

6) R = C$_{18}$H$_{37}$

Organic Polymeric Materials

[I] Addition polymer

1) Polyacrylic acid

2) Polyacrylic acid ester

3) Acrylic acid copolymer

4) Acrylic acid ester copolymer

5) Polyvinyl acetate

6) Vinyl acetate copolymer

[II] Condensation polymer

1) Polyimide

2) Polyamide

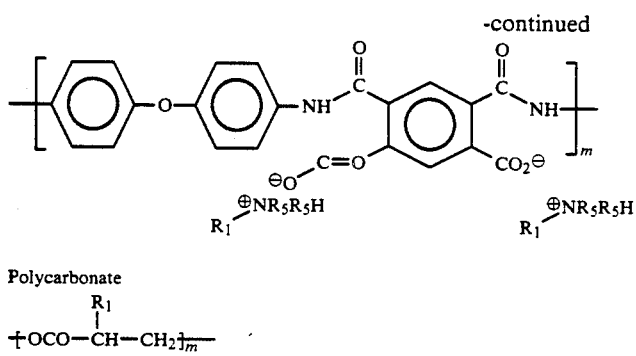

Polycarbonate

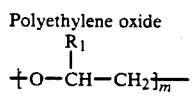

[III] Ring-opening polymer

Polyethylene oxide    1)

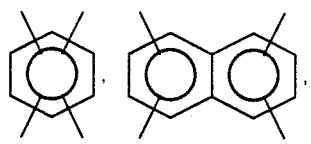

Here, $R_1$ is a long chain alkyl group introduced for formation of monomolecular film on the water surface easier, and its carbon number n should be preferably $5 \leq n \leq 30$.

$R_5$ is a short chain alkyl group, with the carbon number being preferably $1 \leq n \leq 4$. The polymerization degree m may be preferably $100 \leq m \leq 5000$.

Among these specific examples, above all organic materials excellent in solvent resistance suitable for the present invention are following polymers.

For example, they are polyimides obtained by cyclization of polyamic acids, polyamic acid salts, polyamic acid esters, and those having the repeating unit represented by the formula (1) with weight average molecular weights of 20,000 to 3,000,000 which were cyclized and imidated.

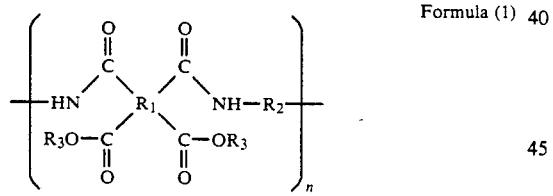

Formula (1)

In the formula, $R_1$ is a tetravalent group having at least 6 carbon atoms, and specific examples may include:

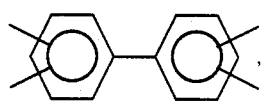

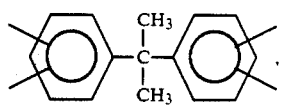

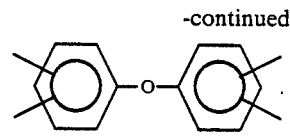

$R_2$ is a divalent group having at least 2 carbons, and specific examples may include:

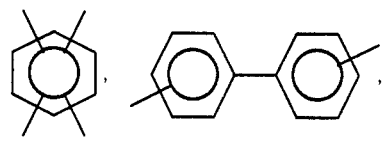

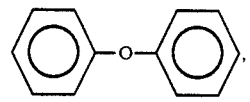

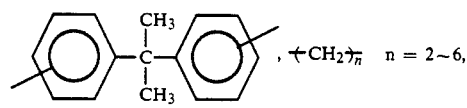, $+CH_2+_n$ n = 2~6,

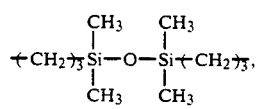

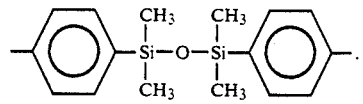

$R_3$ is a monovalent group having at least 6 carbon atoms or a quaternary ammonium salt having at least 6 carbon atoms, and has a structure represented by the formula (2).

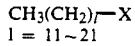 Formula (2)
l = 11~21

The compounds as mentioned above as specific examples are only basic structures, and various substituted derivatives of these compounds are also suitable in the present invention as a matter of course.

Dye materials suitable for the LB method other than those as mentioned above are of course suitable for the present invention. For example, biological materials of which study is becoming popular (e.g. bacteriorhodopsin or cytochrome c) or synthetic polypeptides (PBLG, etc.) and others may be also applicable.

Such amphiphilic molecule forms a monomolecular film with the hydrophilic group directed downward. The monomolecular layer on the water surface has the characteristics of the two-dimensional system. When the molecules are scattered sparsely, the following formula of the two-dimensional ideal gas is valid between the area per one molecule A and the surface pressure $\pi$:

$$\pi A = kT,$$

thus becoming "gas film". Here, k is the Boltzmann's constant and T is an absolute temperature. When A is made sufficiently small, intermolecular interactions are strengthened, whereby the molecules become "condensed film (or solid film)" of a two-dimensional solid. The condensed film can be transferred, one layer by one layer, onto the surface of any desired body having various materials and shapes such as glass or resin. By use of this method, a monomolecular film or built-up films thereof can be prepared, and used as the recording layer.

As a specific preparation method, the following method may be employed.

Figure 11:
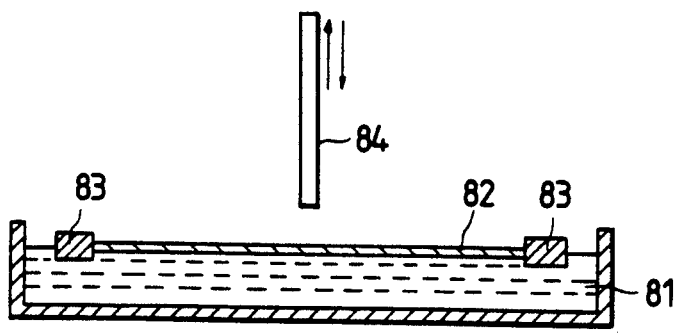
FIG. 11 is a schematic view of the film forming device of built-up films.

A desired organic compound is dissolved in a solvent such as chloroform, benzene, acetonitrile, etc. Next, such solution is spread on an aqueous phase 81 by means of an appropriate device as shown in FIG. 11 in the accompanying drawings to form the organic compound in shape of a film.

Figure 12A:
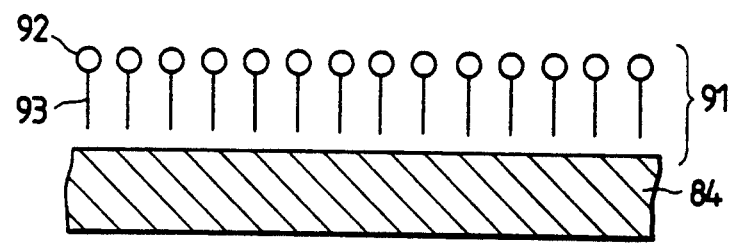
FIGS. 12A and 12B are schematic views of monomolecular films.

Subsequently, a partitioning plate (or a float) 83 is provided to prevent too broad expansion of the spreading layer 82 through free diffusion on the aqueous phase 81, whereby the spreading area of the spreading film 82 is restricted to control the gathered state of the film substance and obtain a surface pressure $\pi$ in proportion to the gathered state. By moving this partitioning plate 83, the gathered state of the film substance can be controlled by reducing the spreading area, whereby the surface pressure can be gradually elevated to be set at a surface pressure suitable for preparation of the film. With the surface pressure kept constant, by moving vertically a clean substrate 84 gently, a monomolecular film of an organic compound is transferred onto the substrate 84. Such monomolecular film 91 is a film having molecules orderly arranged as shown in FIG. 12A or 12B.

The monomolecular film 91 can be thus produced, and a built-up film with desired built-up number can be formed by repeating the above operation. For transfer of the monomolecular film 91 onto the substrate 84, other than the above vertical dipping method, such methods as the horizontal lifting method, the rotating cylinder method, etc., may be employed. The horizontal lifting method is a method in which transfer is effected with the substrate being contacted horizontally on the water surface, and the rotating cylinder method is a method in which the monomolecular layer is transferred onto the substrate surface by rotating a cylindrical substrate on the water surface.

Figure 12B:
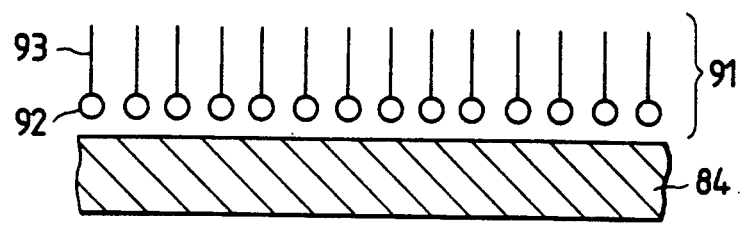
Figure 13A:
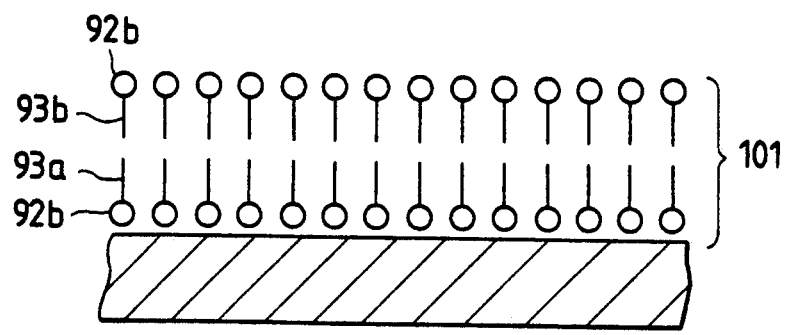
FIGS. 13A, 13B and 13C are schematic views of built-up films.
Figure 13B:
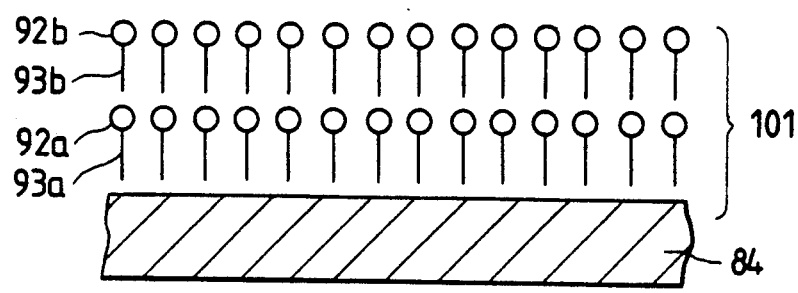
Figure 13C:
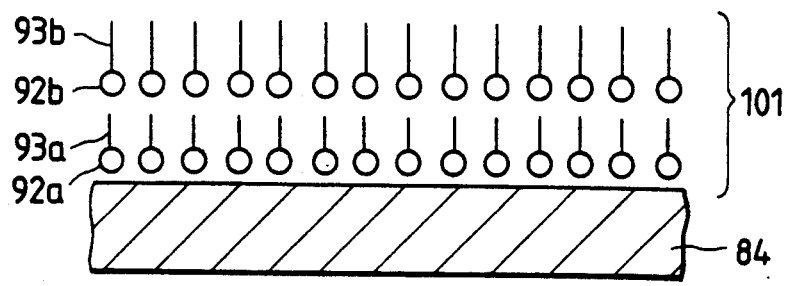

In the vertical dipping method as described above, when a substrate having a hydrophilic surface is withdrawn in the direction transversing the water surface, a monomolecular film 91 of the organic compound with the hydrophilic sites 92 of the organic compound directed toward the substrate 84 side is formed on the substrate 84 (FIG. 12B). When the substrate 84 is moved vertically, monomolecular films 91 are laminated one layer by one layer in the respective steps to form a built-up film 101. Since the direction of the film forming molecules in the withdrawing step becomes opposite to that of the dipping step, there is formed a Y type film according to this method in which the hydrophobic sites 93a and 93b of the organic compound are faced to each other between the respective layers (FIG. 13A). In contrast, in the horizontal lifting method, the monomolecular film 91 is formed on the substrate 84 with the hydrophobic site 93 of the organic compound faced toward the substrate 84 side (FIG. 12A). According to this method, even when the monomolecular film 91 may be built up, there is no change in direction of the film forming molecules, but there is formed an X type film in which the hydrophobic sites 93a and 93b are faced toward the substrate side in all of the layers (FIG. 13B). On the contrary, a built-up film 101 in which the hydrophilic sites 92a and 92b are faced toward the substrate 84 side is called a Z type film (FIG. 13C).

The method for transferring the monomolecular film 91 onto a substrate 84 is not limited to the above methods, but it is also possible to employ a method in which a substrate is extruded into an aqueous phase from a roll, when employing a large area substrate. The direction of the hydrophilic groups and the hydrophobic groups toward the substrate as described above are given as a general rule, and it can also be modified by the surface treatment of the substrate, etc.

As described above, a potential barrier layer comprising the monomolecular film 91 of an organic compound or its built-up film is formed on the substrate 84.

The thickness of such monomolecular film or built-up films as the recording layer is required to be in the range of from 4 Å to 1000 Å, preferably from 10 Å to 1000 Å, more preferably from 50 Å to 500 Å.

In the present invention, the substrate 84 for supporting the thin film comprising a lamination of the organic material may be any of metal, glass, ceramics, plastic materials, etc., and further a biological material with remarkably lower heat resistance can also be used.

The substrate 84 as described above may be in any desired shape, preferably in a flat plate, which is not limitative of the present invention at all. This is because the above film forming method has such advantage that the film can be formed exactly in accordance with the shape of the substrate surface independently of the shape of the substrate surface.

The material of the fine lone electrode of the recording medium to be used in the present invention may be one having high electroconductivity, as exemplified by enumerous materials including typically metals such as Au, Pt, Ag, Pd, Al, In, Sn, Pb, W, etc. and alloys thereof, further graphite and silicide, still further electroconductive oxides such as ITO, etc. As the electrode formation method by use of such materials, there may be included, for example, the vacuum vapor deposition method, the electron beam vapor deposition method, the mask vapor deposition method, the sputtering method, the lithographic method, etc.

Among such thin film formation techniques, above all by use of the lithographic method, the size of the fine lone electrode can be miniaturized, whereby higher densification equal to optical memory or more can be effected. Also, when performing recording onto a recording layer having the electrical memory effect to be used in the present invention, etc., it has been required to perform initialization by application of a voltage.

However, according to the present invention, by addition of a process which applies a voltage between the above fine lone electrode and the counter-electrode to the patterning process according to the lithographic technique during formation of fine lone electrode, it has become possible to initialize at one time the recording layer as a whole, whereby the labors of initialization by applying voltages one by one on the fine lone electrodes could be omitted. Also, since initialization can be effected in the recording medium preparation steps, it also becomes possible to omit the device for initialization from the recording and reproducing device.

Here, FIG. 3 shows simply an example of the recording medium preparation method by use of the lithographic method. First, a thin film of an electroconductive material which becomes the counter-electrode 2 is formed on the substrate 1 (FIG. 3A). On the counter-electrode 2 is formed an organic recording layer 3 having the electrical memory effect (FIG. 3B), and a thin film of an electroconductive material which becomes the fine lone electrode 4 is formed thereon over the whole surface (FIG. 3C). Next, as shown in FIG. 3D, the voltage is applied with the power source 5 for initialization between the counter-electrode and the electrode layer to initialize the whole recording layer. Then, by use of the lithographic technique, fine lone electrodes 4 are formed to desired sizes and shapes (FIG. 3E) to prepare a recording medium. FIG. 3F is a view of the recording medium as seen from above.

However, according to the recording preparation method as described above, there has been employed the method in which an electroconductive layer for fine lone electrode was formed on the whole surface of an organic recording layer, then a voltage is applied to effect initialization and fine lone electrodes are formed by photoetching process, but it is not necessary to limit the method to this. For example, after formation of an organic recording layer, fine lone electrodes may be also formed by use of the lift-off process. However, in this case, a resist is formed to a desired pattern on the organic recording layer, and an electroconductive thin film for fine lone electrodes is laminated thereon over the whole surface before application of a voltage for initialization between the counter-electrode and the fine lone electrodes, followed by formation of fine lone electrodes according to the lift-off process.

Figure 4:
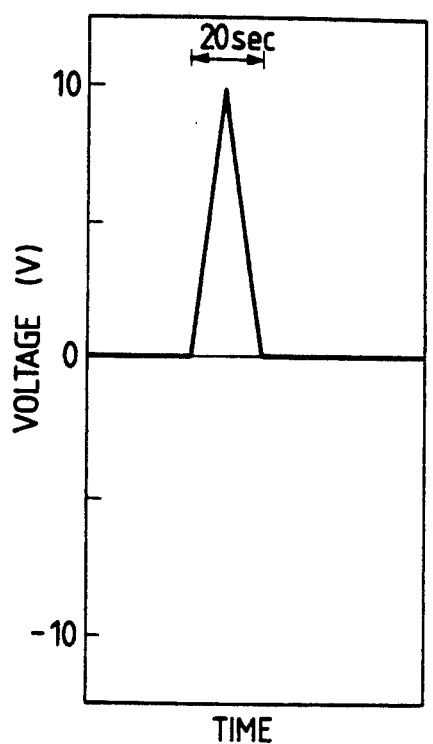
FIG. 4 is the signal waveform for initialization.

The applied voltage for initialization of the recording has employed in the example of the present invention a triangular wave of a wave height value of +10 V and a period of 20 sec. as shown in FIG. 4, but the wave height value, the period and the waveform are not limited to these, but any condition which can perform initialization stably may be employed. However, concerning the wave height value, +5 V to +15 V is preferable in characteristics of the device. This is because no stable initialization can be done at a value smaller than +5 V, while if over +15 V, deterioration of the device is liable to occur. The voltage application time, which may also depend on the wave height value of the applied voltage, may be preferably 180 sec. or shorter in view of deterioration of the device. Concerning the waveform, in addition to a triangular wave, a sine wave, a rectangular wave, etc. may be employed.

Also, as to the electrode shape of the fine lone electrode, a square type, a round type, etc. may be conceivable, but these are not limitative, but any desired shape can be chosen. Also, as to the size of the fine lone electrode, various sizes can be adopted, but in view of recording density, those as small as possible are preferred. For example, sizes of 10000 $\mu m^2$ or less, preferably 1 $\mu m^2$ or less at which the density becomes as high as that of the optical memory, are preferred, and the size of the electrode may be also made smaller to the extent of the size of the molecule because the recording layer itself can be utilized as the molecular memory.

On the other hand, the materials of the substrate electrode (counter-electrode) to be used in the present invention may be one having high electroconductivity, as exemplified by enumerous materials, including typically metals such as Au, Pt, Ag, Pd, Al, In, Sn, Pb, W and alloys thereof, further graphite and silicide, still further electroconductive oxides such as ITO, and these may be considered to be applicable to the present invention. As the electrode formation method by use of these materials, the thin film formation techniques known in the art may be satisfactory. However, the electrode material to be formed directly on the substrate should be desirably an electroconductive material which will not form an insulating oxide on the surface during formation of LB film, such as a noble metal or an oxide electroconductive material such as ITO, etc.

As the material for the probe electrode, any material which exhibits electroconductivity and can apply a voltage on the recording layer through fine lone electrodes may be available, as exemplified by Pt, Pt-Ir, W, Au, Ag, etc. The tip end of the probe electrode is required to be pointed so far as possible corresponding to the size of the fine lone electrode. In the present invention, the probe electrode is prepared by controlling the tip end shape of the needle-like electroconductive material by use of the electro chemical polishing method, but the preparation method and the shape of the probe electrode are not limited to these at all.

Figure 8:
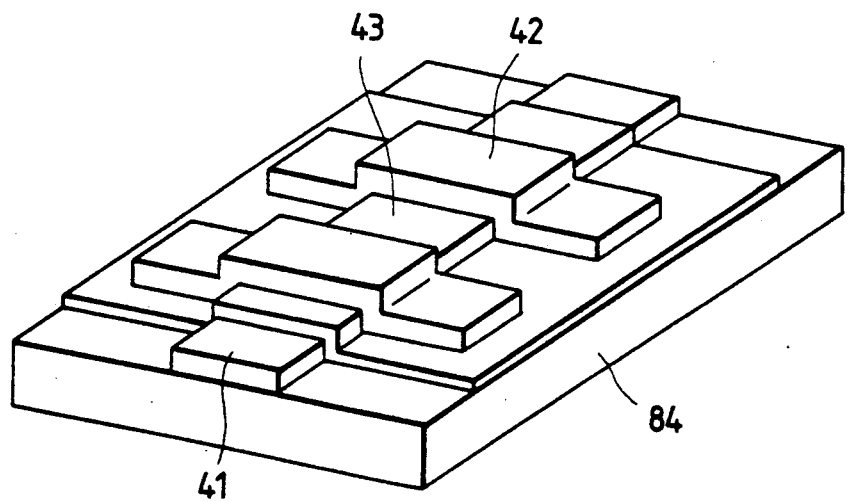
FIG. 8 is a schematic constitutional view of MIM device.
Figure 9:
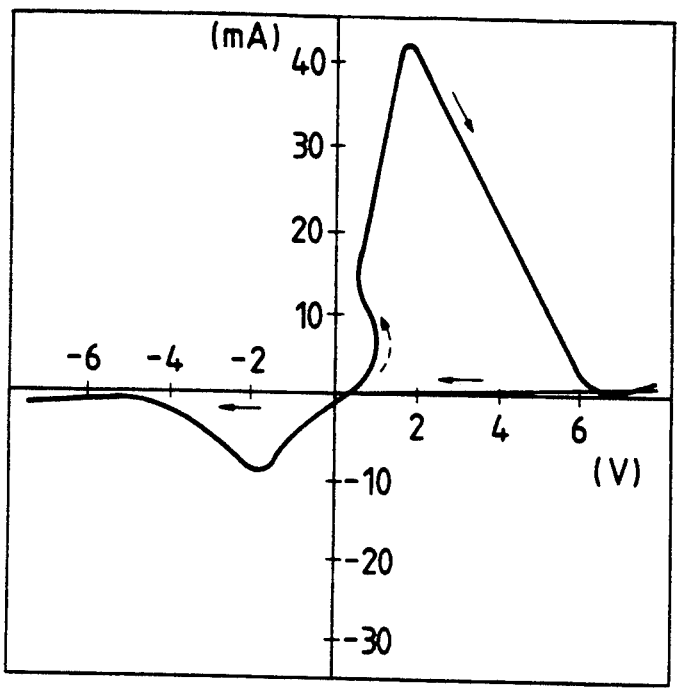
FIG. 9 and FIG. 10 are characteristic graphs exhibiting electrical characteristics obtained from the device in FIG. 8.
Figure 10:
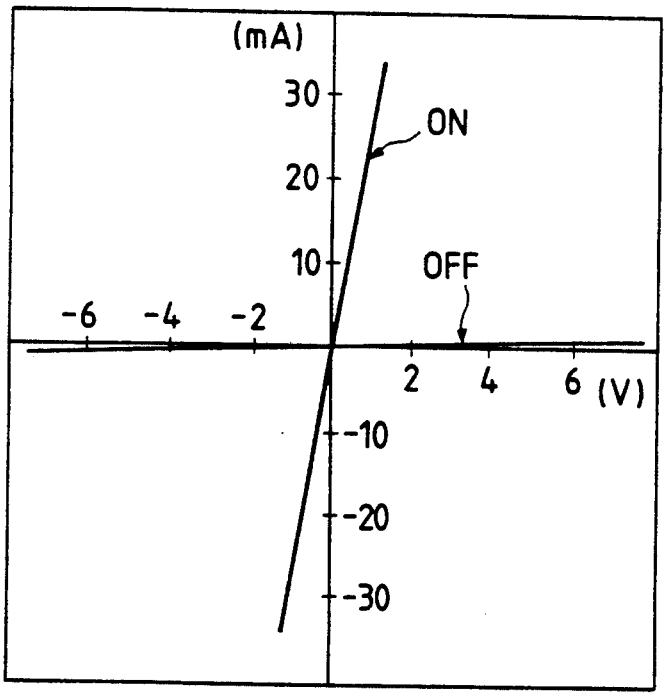

When a device with the MIM structure as shown in FIG. 8 is prepared by use of the materials and the film forming method as described above, a memory switching device exhibiting the current-voltage characteristics (the electrical memory effect) as shown in FIG. 9 and FIG. 10 is obtained, and it has been already found that the two states (ON state which is the low resistance state and OFF state which is the high resistance state) have respectively the memory characteristics. The memory characteristic means that the previous state is maintained, so long as the voltage applied does not exceed a specific value (threshold value). These memory switching characteristics are realized for those with layer thickness of 4 Å to some 1000 Å, but the recording medium in the present invention should preferably have a layer thickness in the range from 10 Å to 1000 Å, most preferably from 50 Å to 500 Å. When built-up films are formed by the LB method to form an organic insulating film, the number of layers laminated should be preferably about 1 to 50. In the laminated layers, layer thickness as mentioned above, the resistance preferable in memory characteristics is desirably some M $\Omega$ or higher in OFF state.

In FIG. 8, 84 represents a substrate, 41 an Au electrode, 42 an Al electrode and 43 the monomolecular built-up film.

Figure 2:
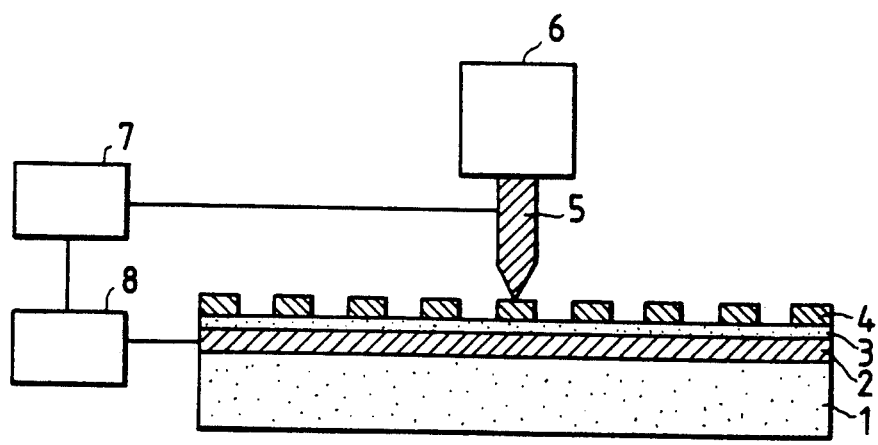
FIG. 2 is a schematic constitutional view of the recording and reproducing device of the present invention.

FIG. 2 illustrates schematically the device for performing recording and reproduction onto the recording medium of the present invention. In FIG. 2, 5 is a probe electrode for applying a voltage on the recording medium, and by application of a voltage from the probe electrode through the fine lone electrodes onto the recording layer, recording and reproduction are effected. 6 is a movement control mechanism in the XYZ directions (three-dimensional fine movement control mechanism), and with this, recording and reproduction can be effected by movement of the position of the probe electrode to the fine lone electrode at any desired position. 7 is a pulse power source, 8 a signal reader, performing recording by application of a voltage on the recording medium from the pulse source or performing reproduction by detection of the current which flows through the recording medium by the signal reader.

Figure 5:
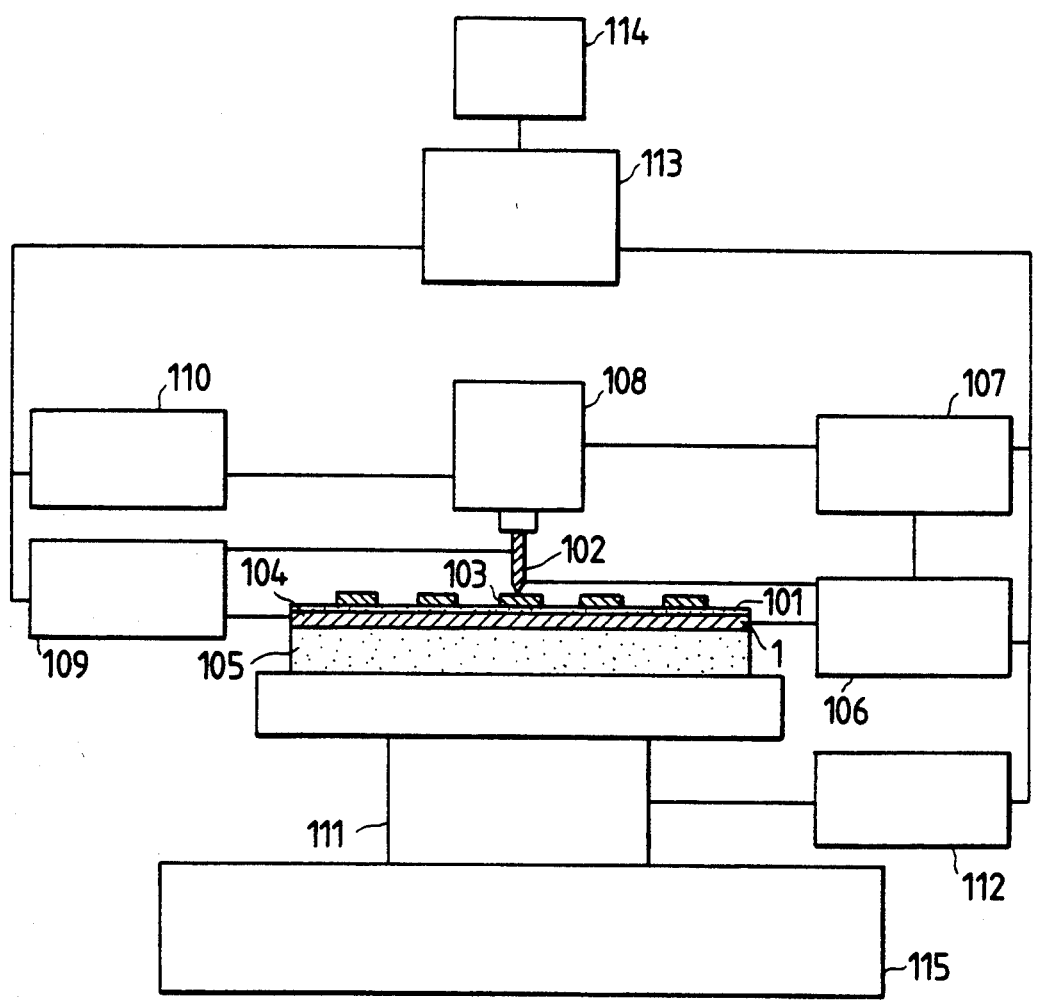
FIG. 5 is another constitutional view of the recording and reproducing device of the present invention.

FIG. 5 is a block constitutional diagram showing the recording and reproducing device of another embodiment of the present invention. In FIG. 5, 106 is a probe current amplifier which is also equipped with a circuit for applying a bias voltage for reproduction. 107 is a servo circuit for controlling the fine movement control mechanism 108 by use of a piezoelectric element so as to control the distance between the both so that a voltage can be applied through the fine lone electrode 103 from the probe electrode 102 on the recording layer 101. 109 is a power source equipped with a pulse voltage application circuit for recording/erazing for applying a pulse voltage for recording and erasing through the fine lone electrode 103 on the recording layer 101 between the probe electrode 102 and the counter-electrode 104.

110 is an XY scanning driving circuit for controlling movement of the probe electrode 102 in the XY direction (recording layer surface direction).

111 and 112 are rough movement control mechanisms for approaching previously the distance between the probe electrode 102 and the recording medium 1 on the substrate 105.

115 is an XY stage for rough movement in the XY direction.

These respective instruments are all controlled centrally by a microcomputer 113. 114 represents a display instrument.

Figure 6A:
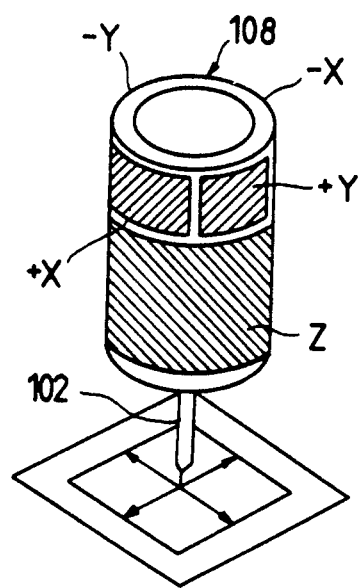
FIGS. 6A and 6B are a schematic illustration and a scanning descriptive illustration of the fine control mechanism.
Figure 6B:
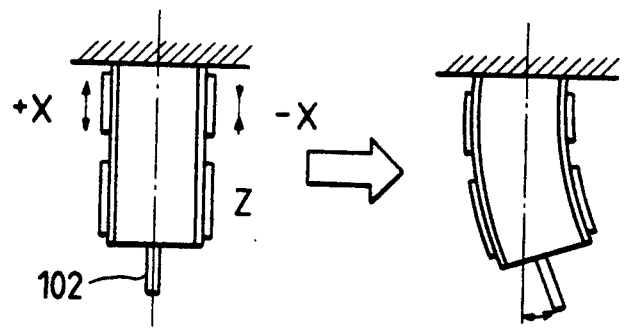

FIG. 6A shows a schematic illustration of a fine movement control mechanism 108, a probe electrode 102, and the recording medium. The fine movement control mechanism 108 has electrodes for applying voltages for fine movement control in the directions of X, Y and Z, respectively, and, for example, as shown in FIG. 6B, it can scan in the X direction by application of voltages at +X and −X.

Referring now to Examples, the present invention is described.

EXAMPLE 1

An optically polished glass substrate (substrate) was washed with a neutral detergent and Triclene (Trichloroethylene), then Cr was deposited as the subbing layer by vacuum vapor deposition (resistance heating) method to a thickness of 50 Å, and further Au was vapor deposited by the same method to 400 Å, to form a counter-electrode.

Next, a chloroform solution containing squariliumbis-6-octylazulene (hereinafter abbreviated as SOAZ) dissolved therein at a concentration of 0.2 mg/ml was spread onto the aqueous phase of 20° C. to form a monomolecular film on the water surface. After evaporation of the solvent, the surface pressure of such monomolecular film was enhanced to 20 mN/m, and further the above electrode substrate was dipped gently at a speed of 5 mm/min. so as to cross the water surface while maintaining constantly the surface pressure, and further drawn up, thereby building up a Y-type monomolecular film of two layers. By repeating this operation for appropriate times, a built-up film of 8 layers was formed on the above counter-electrode to provide a recording layer 3.

Then, on the recording layer composed of the SOAZ-LB film, a plurality of Al electrodes with a thickness of 500 Å and a size of 50 μm square were formed as the fine lone electrodes 4 by the vacuum mask vapor deposition (resistance heating) method, thereby preparing a recording medium of the present invention.

Next, on the recording medium prepared according to the method as described above, the experiments of recording, reproduction and erasing were carried out by use of the recording and reproducing device shown in FIG. 2. However, as the probe electrode 5, a probe electrode made of platinum/rhodium prepared according to the electro chemical polishing method is used, and the probe electrode 5 is controlled in its distance (Z) by a piezoelectric element so that a voltage can be applied on the recording medium through the fine lone electrodes 4 on the recording layer 3. Further, the movement control mechanism 6 is designed so that the movement control can be done in the interplanar (X, Y) directions. Hence, by the movement control mechanism 6, recording, reproduction and erasing of the fine lone electrode at any desired position can be effected by the probe electrode 5.

Figure 7:
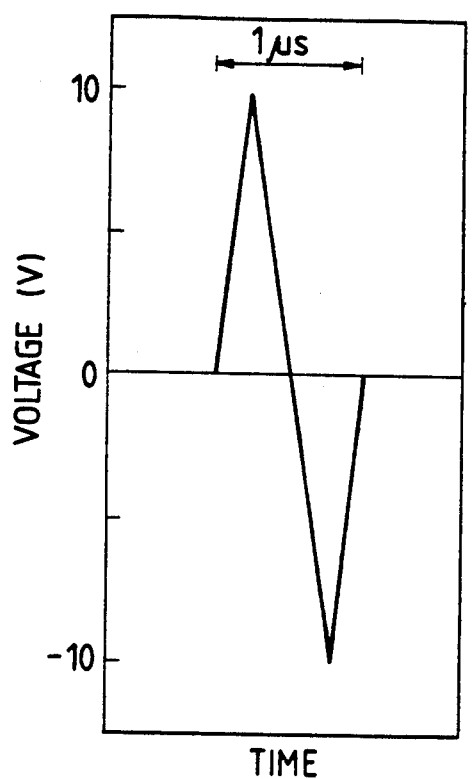
FIG. 7 is the recording signal waveform.

The recording medium having the recording layer 3 with 8 built-up SOAZ layers was set on the recording and reproducing device, and first the position of the electrode 5 was determined by visual observation and fixed firmly. Next, the position of the probe electrode 5 was controlled by the movement control mechanism 6 so that a voltage can be applied between the Au electrode 2 and Al electrodes 4 which become the fine lone electrodes. By application of a voltage for reading of 1.5 V from the probe electrode 5 which is a voltage not exceeding the threshold value of voltage which causes the memory effect to occur between the Al electrode and the Au electrode, the current value was measured by the signal reader 8. As the result, OFF state was exhibited under μA or less. Next, after application of a triangular wave pulse voltage having a waveform shown in FIG. 7 which is the voltage of the threshold value $V_{th\text{-}ON}$ which causes ON state to occur or more from the pulse power source 7, the current was measured by applying again a voltage of 1.5 V between the electrodes. As the result, a current of about 0.7 mA flowed, indicating that the state became ON state. That is, ON state was recorded.

Next, after application of a triangular wave pulse voltage with a peak voltage of 5 V which is the threshold $V_{th\text{-}OFF}$ changing from ON state to OFF state or more and a pulse width of 1 μsec., a voltage of 1.5 V was again applied, whereby the current value was μA or less to confirm returning to OFF state.

Next, when the experiments of recording, reproducing and erasing as previously described were conducted with movement of the position of the probe electrode 5 to another fine lone electrode different from the above electrode by the movement control mechanism 6, entirely the same results were obtained, whereby it was confirmed that the recording medium of the present invention was effective.

After ON state and OFF state were prepared according to the methods as described above, photoirradiation was effected on the recording medium of the present invention and reproduction was performed by applying again a voltage of 1.5 V at the site recorded, whereby a current of sub-mA order flowed even after photoirradiation at the portion where ON state was exhibited before photoirradiation, while only a current of μA or less flowed at the portion of OFF state without recognition of change in recorded information by photoirradiation. Thus, light fastness, namely stability was found to be excellent. Also, both the states of ON state and OFF state could be stored for a long term of 3 months.

Separately from the above experiment, 7 kinds of recording media were prepared with recording layers of 2, 4, 12, 20, 30, 40 and 60, and also for these recording media, the same recording and reproducing experiment as described previously was conducted. The evaluation results are shown in Table 1.

Evaluation was made by overall judgement by goodness of recordability and erasability after application of a recording writing pulse and an erasing voltage, further by comparison of the current values under recorded state and erased state (ON/OFF ratio), and stability. Particularly good one is represented by ⊚, good one ◯, and one slightly lower in evaluation as compared with others △.

The thickness per one SOAZ layer was determined by the small angle X-ray diffraction method to be about 15 Å.

EXAMPLE 2

The same recording medium as in Example 1 was prepared except for using a polyimide in place of the SOAZ recording layer used in Example 1. Also for this recording medium, the experiments of recording, reproduction and erasing were conducted in the same manner as in Example 1. The results of recordability, ON/OFF ratio and erasability were summarized in Table 1. Similarly as SOAZ, when a polyimide was employed for the recording layer, recording and reproduction of data signals could be done without change in data signals by photoirradiation being recognized, whereby a recording medium with excellent light fastness could be provided.

The method forming the polyimide film was as described below.

A dimethylacetamide solution containing a polyamic acid (molecular weight about 200,000) dissolved at a concentration of $1 \times 10^{-3}\%$ (g/g) was spread on the aqueous phase of pure water of a water temperature of 20° C. to form a monomolecular film on the water surface. The surface pressure of the monomolecular film was enhanced to 25 mN/m, and further while maintaining constantly the surface pressure, the above substrate was dipped and drawn up by movement at 5 mm/min. so as to cross the water surface, to build up Y-type monomolecular films. By repeating such operations, 7 kinds of built-up films with 12, 18, 24, 30, 36, 42 and 60 layers were prepared. Further, these films were heated at 300° C. for 10 minutes into polyimides.

The thickness per one polyimide layer was determined by ellipsometry to be about 4 Å.

TABLE 1

| Organic compound | Built-up number | Recordability | ON/OFF ratio | Erasability | Light fastness |
|---|---|---|---|---|---|
| SOAZ | 2 | △ | ⊚ | ⊚ | ⊚ |
|  | 4 | ◯ | ⊚ | ⊚ | ⊚ |
|  | 8 | ⊚ | ⊚ | ⊚ | ⊚ |
|  | 12 | ⊚ | ⊚ | ⊚ | ⊚ |
|  | 20 | ⊚ | ⊚ | ⊚ | ⊚ |
|  | 30 | ⊚ | ⊚ | ⊚ | ⊚ |

TABLE 1-continued

| Organic compound | Built-up number | Recordability | ON/OFF ratio | Erasability | Light fastness |
|---|---|---|---|---|---|
|  | 40 | ◯ | ⊚ | ⊚ | ⊚ |
|  | 60 | △ | ⊚ | ⊚ | ⊚ |
| Polyimide | 12 | ◯ | ⊚ | ⊚ | ⊚ |
|  | 18 | ⊚ | ⊚ | ⊚ | ⊚ |
|  | 24 | ⊚ | ⊚ | ⊚ | ⊚ |
|  | 36 | ⊚ | ⊚ | ⊚ | ⊚ |
|  | 42 | ◯ | ⊚ | ⊚ | ⊚ |
|  | 60 | △ | ⊚ | ⊚ | ⊚ |

EXAMPLE 3

Experiments were carried out in the same manner as in Example 1 except for using t-butyl derivative of lutetium diphthalocyanine [LuH(Pc)$_2$] in place of the SOAZ layer used in Example 1. However, the layer numbers of the recording layers were made 8 kinds of 2, 4, 8, 12, 20, 30, 40 and 60 layers similarly as the SOAZ recording layers.

The results of the recordability, ON/OFF ratio, erasability and light fastness were entirely the same as in the case of SOAZ recording film, and similarly as SOAZ, recording and reproduction of data signals could be done also in t-butyl derivative of lutetium diphthalocyanine [LuH(Pc)$_2$], without recognition of change in data signals by photoirradiation. Thus, light fastness was found to be excellent.

The built-up conditions of t-butyl derivative of LuH(Pc)$_2$ are as follows.

Solvent: chloroform/trimethylbenzene/acetone (1/1/2)

Concentration: 0.5 mg/ml

Aqueous phase: pure water, water temperature 20° C.

Surface pressure: 20 mN/m

Substrate vertical movement speed: 3 mm/min.

EXAMPLES 4–6

By use of a polyimide as the recording layer, recording media were prepared by use of the electrode materials shown in Table 2 and the same experiments as in Example 1 were carried out, whereby the results shown in Table 2 were obtained. As shown by the mark ⊚ in the Table, concerning all of the recording media, sufficient recording and reproducing characteristics and light fastness were obtained.

The layer number of the polyimide LB films was 24 in all the Examples. Au electrode was vacuum deposited by use of the resistance heating method, Pt electrode by the EB method and ITO by the sputtering method.

TABLE 2

| Example | Counter-electrode | Recording layer | Fine lone electrode | Recording reproduction | Light fastness |
|---|---|---|---|---|---|
| 4 | Pt | Polyimide | Al | ⊚ | ⊚ |
| 5 | ITO | Polyimide | Al | ⊚ | ⊚ |
| 6 | Pt | Polyimide | Au | ⊚ | ⊚ |

EXAMPLE 7

A recording medium was prepared in the order shown in FIG. 3.

First, an optically polished glass substrate (substrate 1) was washed with a neutral detergent and Triclene, then Cr was deposited to a thickness of 50 Å as the subbing layer by the vacuum deposition (resistance heating) method, and further Au was vapor deposited to 400 Å by the same method, to form a counter-electrode.

Next, by use of the LB method, 24 built-up layers of a polyimide monomolecular film were formed to provide a recording layer 3.

Figure 3A:
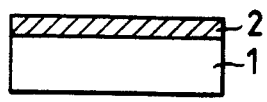
FIGS. 3A to 3F are examples of the method for preparing the recording medium in the present invention.
Figure 3B:
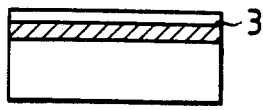
Figure 3C:
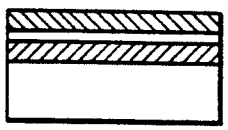
Figure 3D:
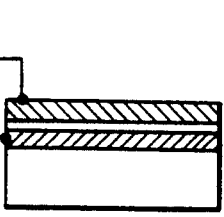
Figure 3E:
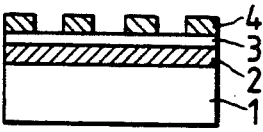
Figure 3F:
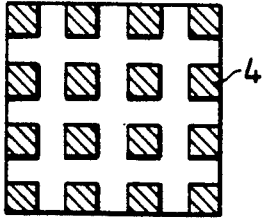

On such polyimide recording layer 3 Al was formed to 1000 Å according to the vacuum vapor deposition (resistance heating) method. Then, by use of a power source 5 for initialization as shown in FIG. 3D, and by applying a triangular wave with a wave height value of +10 V and a period of 20 sec. as shown in FIG. 4 as the voltage for initialization of the recording layer between the Au electrode which is the counter-electrode and the Al electrode previously formed, initialization of the whole recording layer was effected.

Next, on the Al electrode was spinner coated a posi-type resist material (trade name: OMR-83) to a film thickness of 1.2 μm, followed by exposure, developing and post baking. Then, Al was etched in lattice shape to a pattern size of 2 μm square with 2 μm intervals with a solution of $H_3PO_4:HNO_3:CH_3COOH:H_2O=16:1:2:1$. Such substrate was subjected to acetone ultrasonic cleaning, dimethylformamide (DMF) ultrasonic cleaning, pure water washing to peel off the resist, followed by baking, to form plural fine lone electrodes 4 with sizes of 2 μm square (see FIG. 3F).

Next, on the recording medium prepared according to the method as described above, the experiments of recording, reproduction and erasing were conducted by use of the recording and reproducing device shown in FIG. 2. However, as the probe electrode 5, a probe electrode made of platinum/rhodium prepared by the electro chemical polishing method was employed, and the probe 5 was controlled in its distance (Z) by a piezoelectric element so that a voltage could be applied through the fine lone electrodes 4 on the recording layer 3 onto the recording medium. Further, the movement control mechanism 6 was designed so as to be controllable also in the interplanar (X, Y) directions, while having the above-mentioned function. Hence, by the movement control mechanism 6, recording, reproduction and erasing of the fine lone electrode at any desired position can be effected by the probe electrode 5.

The recording medium having a recording layer 3 with 24 built-up layers of polyimide was set on the recording and reproducing device, and first the position of the probe 5 was determined by visual observation to be firmly fixed. Next, the position of the probe electrode 5 was adjusted by the movement control mechanism 6 so that a voltage could be applied between the Au electrode and the Al electrode which becomes the fine lone electrode. When the current value was measured by the signal reader 8 by applying a voltage for reading of 1.5 V which is a voltage (bias voltage) not exceeding the threshold value voltage which causes the electrical memory effect to occur between the Al electrode and the Au electrode from the probe electrode 5, a current of sub-μA order flowed to indicate OFF state, whereby the recording layer was found to be initialized. Next, after application of a triangular pulse voltage having a wave height value of the threshold value voltage $V_{th-ON}$ which gives rise to ON state or higher from the pulse power source 7, the current was measured by applying again a voltage of 1.5 V (bias voltage) between the electrodes, a current of about 0.7 mA flowed, thus indicating establishment of ON state. That is, ON state was recorded.

Next, after application of a triangular pulse voltage with a peak voltage of 5 V and a pulse width of 1 μsec which is a voltage of the threshold value of voltage $V_{th-OFF}$ or more at which the change from ON state to OFF state occurs, a voltage of 1.5 V (bias voltage) was applied again, whereby the current value at this time was found to be sub-μA order and confirmed to be returned to OFF state.

Also, both ON state and OFF state could be stored for a long term of 3 months.

Next, the experiments of recording, reproduction and erasing as described previously of the were conducted with movement of the position of the probe electrode 5 by the movement control mechanism 6 to a plurality of fine lone electrodes separate from those as mentioned above, the recording layer was initialized in every fine lone electrode to give the same results for all of recording, reproduction and erasing, whereby the recording medium of the present invention was confirmed to be effective. That is, according to the recording medium preparation method, it has been found that the size of 1 bit can be made 2 μm square, whereby a high density recording medium comparable with an optical memory can be provided.

Also, separately from the above, 6 kinds of recording media with layers of 12, 18, 30, 36, 42 and 60 were prepared, and for these recording media, the same recording and reproduction experiments as described previously were conducted. The evaluation results are shown in Table 3.

Evaluation was made by overall judgement by goodness of recordability and erasability after application of a recording writing pulse and an erasing voltage, further by comparison of the current values under recorded state and erased state (ON/OFF ratio), and stability. Particularly good one is represented by ⊚, good one ○, and one slightly lower in evaluation as compared with others Δ.

The thickness per one layer of polyimide was determined by the ellipsometry method to be about 4 Å.

TABLE 3

| Organic compound | Built-up number | Recordability | ON/OFF ratio | Erasability |
|---|---|---|---|---|
| Polyimide | 12 | ○ | ⊚ | ⊚ |
| | 18 | ⊚ | ⊚ | ⊚ |
| | 24 | ⊚ | ⊚ | ⊚ |
| | 30 | ⊚ | ⊚ | ⊚ |
| | 36 | ⊚ | ⊚ | ⊚ |
| | 42 | ○ | ⊚ | ⊚ |
| | 60 | Δ | ⊚ | ⊚ |

EXAMPLE 8

According to the same method as in Example 7, a counter-electrode of Au and recording layers of polyimide (24 layers) were formed on a glass substrate.

On such polyimide recording layers were spinner coated a nega-type resist material (trade name: RD-2000N-10), followed by pre-baking. The film thickness at this time was made 0.7 μm. Subsequently, exposure, development, post-baking were performed to prepare a resist pattern so that fine lone electrodes with a size of 2 μm square could be formed in lattice shape with intervals of 2 μm.

On such substrate, Au which becomes the fine lone electrodes was deposited over the whole surface to 1000 Å by the vacuum vapor deposition method. Then, by application of the same voltage for initialization as in Example 7 between the counter-electrode and the Au electrode on the resist, initialization of the polyimide recording layer was effected.

Next, such substrate was subjected to acetone ultrasonic cleaning, DMF ultrasonic cleaning, pure water washing and baking, a plurality of fine lone electrodes with a size of 2 μm square were formed by lift-off to prepare a recording medium.

Also, for this recording medium, the same experiments as in Example 7 were conducted, whereby every fine lone electrode was found to be initialized, and also the same results as in Example 7 were obtained for all of recording, reproduction and erasing.

Also, the same recording medium as described above was prepared with polyimide recording layers of 12, 18, 30, 36, 42 and 60. As the result, entirely the quite similar results as in Example 7 were obtained, whereby it could be understood that the recording media were effective.

EXAMPLES 9-11

By use of the same lift-off as in Example 8 as the method for forming fine lone electrodes, recording media were prepared by use of the electrode materials shown in Table 4 and the same experiments as in Example 8 were conducted to give the results shown in Table 4. As shown by the mark ⊚ in the Table, concerning all the recording media, initialization of the whole surface of the recording portion could be effected at one time, and yet sufficient recording and reproduction characteristics could be obtained.

The layers of the polyimide LB film are all 24 layers. Au electrode was formed by the resistance heating method, Pt electrode by the EB method and ITO by the sputtering method, respectively.

TABLE 4

| Example | Counter-electrode | Recording layer | Fine lone electrode | Initialization | Recording, reproduction |
|---|---|---|---|---|---|
| 9 | Pt | Polyimide | Al | ⊚ | ⊚ |
| 10 | ITO | Polyimide | Al | ⊚ | ⊚ |
| 11 | Au | Polyimide | Pt | ⊚ | ⊚ |

In the Examples as described above, the LB method was employed for formation of the organic compound recording layers, but a film forming method which can prepare a film very thinly can be used without limitation to the LB method, and as such method, film forming methods such as MBE, CVD methods, etc. may be specifically mentioned.

Also, concerning the formation method of the counter-electrode and the fine lone electrodes, as already mentioned, a film forming method which can prepare a uniform film can be used, and the vacuum vapor deposition method is not limitative.

Further, the substrate materials and shapes thereof are not limited at all in the present invention.

As described above, according to the recording medium of the present invention, the following effects can be obtained.

(1) As compared with optical recording, a recording medium with very excellent environmental resistance, particularly light fastness could be obtained.

(2) Since the recording layer is formed of built-up monomolecular films, film thickness control on the order of molecular size (several Å to several 10 Å) could be easily realized. Also, due to excellent controllability, reproducibility is high in forming the recording layer.

(3) Since the recording layer may be thin, productivity is rich and an inexpensive recording medium can be provided.

(4) Since one information is recorded per one fine lone electrode, by miniaturization of the electrode, a recording and reproducing device with higher density than optical memory device can be provided in the future.

(5) Since initialization of the whole recording medium can be done at one time, the time and labor for initialization could be made minimum.

(6) Since initialization of the recording medium can be done in the recording medium preparation steps, the device for initialization can be omitted from the recording reproducing device, whereby the recording and reproducing device can be made simpler.

(7) Since recording, reproduction and erasing can be done by contact of a probe electrode with fine lone electrodes previously provided, fine control of the distance between the probe and the recording medium surface becomes unnecessary, whereby stabilization of recording and reproduction and access to the recording site become easier.

(8) Since the system of recording information per one fine lone electrode is adopted, by arranging previously the fine lone electrodes regularly as desired, it also becomes possible to perform tracking with the recording bits, namely the fine lone electrode themselves. By this, no guide groove is required to be formed.

We claim:

1. A recording and reproducing device, provided with a recording medium having a recording layer on an electrode substrate and one or a plural number of fine lone electrode made of an electroconductive material provided on said recording layer, at least one probe electrode, a pulse voltage application circuit for recording/erasing and a bias voltage application circuit for reproduction.

2. The recording and reproducing device according to claim 1, wherein said recording layer contains a monomolecular film or built-up monomolecular films of an organic compound.

3. The recording and reproducing device according to claim 2, wherein the film thickness of said monomolecular film or built-up monomolecular films is in the range of from 4 Å to 1000 Å.

4. The recording and reproducing device according to claim 2, wherein said monomolecular film or built-up monomolecular films is Langmuir-Blodgett film.

5. The recording and reproducing device according to claim 2, wherein said organic compound has a group having $\pi$-electron level and a group having $\sigma$-electron level.

6. The recording and reproducing device according to claim 1, wherein said recording medium has the electrical memory effect.

7. The recording and reproducing device according to claim 1, wherein said fine lone electrode on said recording medium is arranged regularly.

8. The recording and reproducing device according to claim 1, wherein said probe electrode has a scanning driving means toward the recording layer surface direction.

9. The recording and reproducing device according to claim 1, having a means for fine controlling three-dimensionally the relative positions of said recording medium and said probe electrode.

10. A recording method, which comprises performing recording by accessing a probe electrode to a recording medium having a recording layer on an electrode substrate and one or a plural number of fine lone electrodes made of an electroconductive material provided on said recording layer, and applying a pulse voltage from said probe electrode through said fine lone electrode on said recording medium.

11. The recording method according to claim 10, wherein said pulse voltage is a voltage in excess of the threshold value of voltage which causes changing electroconductivity in said recording medium.

12. The recording method according to claim 10, wherein said probe electrode is brought into contact with said fine lone electrode.

13. A recording and reproducing method, which comprises performing recording by accessing a probe electrode to a recording medium having a recording layer on an electrode substrate and one or a plural number of fine lone electrodes made of an electroconductive material provided on said recording layer, and applying a pulse voltage from said probe electrode through the fine lone electrode on said recording medium, and performing reproduction of said recording by applying a bias voltage on said recording medium.

14. The recording and reproducing method according to claim 13, wherein said pulse voltage is a voltage in excess of the threshold value of voltage which causes changing electroconductivity in said recording medium.

15. The recording and reproducing method according to claim 13, wherein said bias voltage is a voltage not in excess of the threshold value of voltage which causes changing in electroconductivity in said recording medium.

16. The recording and reproducing method according to claim 13, wherein said probe electrode is brought into contact with said fine lone electrode.

17. A recording, reproducing and erasing method, which comprises performing recording by accessing a probe electrode to a recording medium having a recording layer on an electrode substrate and one or a plural number of fine lone electrodes made of an electroconductive material provided on said recording layer and applying a first pulse voltage from said probe electrode through said fine lone electrode on the recording medium, performing reproducing by applying a bias voltage on said recording medium, and further performing erasing of said recording by applying a second pulse voltage.

18. The recording, reproducing and erasing method according to claim 17, wherein said first voltage is a voltage in excess of the threshold value voltage which causes changing electroconductivity in said recording medium.

19. A recording device, provided with a recording medium having a recording layer on a electrode substrate and one or a plural number of fine lone electrode made of an electroconductive material provided on said recording layer, at least one probe electrode, and a pulse voltage application circuit for recording.

20. The recording device according to claim 19, wherein the recording layer contains a monomolecular film or built-up monomolecular film of an organic compound.

21. The recording device according to claim 20, wherein the film thickness of said monomolecular film or built-up monomolecular films is in the range of from 4 Å to 1000 Å.

22. The recording device according to claim 20, wherein said monomolecular film or built-up monomolecular films is Langmuir-Blodgett film.

23. The recording device according to claim 20, wherein said organic compound has a group having $\pi$-electron level and a group having $\sigma$-electron level.

24. The recording device according to claim 19, wherein said recording medium has the electrical memory effect.

25. The recording device according to claim 19, wherein said fine lone electrode of the recording medium is arranged regularly.

26. The recording device according to claim 19, wherein said probe electrode has a scanning driving means toward the recording layer surface direction.

27. The recording device according to claim 19, having a means for fine controlling three-dimensionally the relative positions of said recording medium and the probe electrode.

28. A recording and reproducing device, provided with a recording medium having a recording layer on an electrode substrate and one or a plural number of fine lone electrode made of an electroconductive material provided on said recording layer, at least one probe electrode, a pulse voltage application circuit for recording and a bias voltage application circuit for reproduction.

29. The recording and reproducing device according to claim 28, wherein said recording layer contains a monomolecular film or built-up monomolecular films of an organic compound.

30. The recording and reproducing device according to claim 29, wherein the film thickness of said monomolecular film or built-up monomolecular films is in the range from 4 Å to 1000 Å.

31. The recording and reproducing device according to claim 29, wherein said monomolecular film or built-up monomolecular films is Langmuir-Blodgett film.

32. The recording and reproducing device according to claim 29, wherein said organic compound has a group having $\pi$-electron level and a group having $\sigma$-electron group.

33. The recording and reproducing device according to claim 28, wherein said recording medium has the electrical memory effect.

34. The recording and reproducing device according to claim 28, wherein said fine lone electrode on said recording medium is arranged regularly.

35. The recording and reproducing device according to claim 28, wherein said probe electrode has a scanning driving means toward the recording layer surface direction.

36. The recording and reproducing device according to claim 28, having a means for fine controlling three-dimensionally the relative positions of said recording medium and said probe electrode.

37. The recording, reproducing and erasing method according to claim 17, wherein said bias voltage is a voltage not in excess of the threshold value of voltage which causes the changing electroconductivity in said recording medium.

38. The recording, reproducing and erasing method according to claim 17, wherein said second pulse voltage is a voltage in excess of the threshold value of voltage which causes changing electroconductivity in said recording medium.

39. The recording, reproducing and erasing method according to claim 17, wherein said probe electrode is brought into contact with said fine lone electrode.

* * * * *

UNITED STATES PATENT AND TRADEMARK OFFICE
CERTIFICATE OF CORRECTION

PATENT NO. : 5,264,876
DATED : November 23, 1993
INVENTOR(S) : HISAAKI KAWADE, ET AL.

It is certified that error appears in the above-identified patent and that said Letters Patent is hereby corrected as shown below:

ON TITLE PAGE

In [57] Abstract, Line 3: "electrode" should read --electrodes--.

COLUMN 2

Line 46, "electrode" should read --electrodes--.
Line 52, "electrode" should read --electrodes--.

COLUMN 3

Line 20, "a" (second occurrence) should read --an--.
Line 21, "electrode" should read --electrodes--.
Line 27, "a" (second occurrence) should read --an--.
Line 29, "electrode" should read --electrodes--.
Line 36, "a" (first occurrence) should read --an--.
Line 37, "electrode" should read --electrodes--.
Line 51, "method" should read --embodiment--.
Line 63, "erazing" should read --erasing--.

COLUMN 4

Line 53, "electrode" should read --electrodes--.

COLUMN 6

Line 24, "quaternary," should read --quaternary),--.

UNITED STATES PATENT AND TRADEMARK OFFICE
CERTIFICATE OF CORRECTION

PATENT NO. : 5,264,876
DATED : November 23, 1993
INVENTOR(S) : HISAAKI KAWADE, ET AL.

Page 2 of 4

It is certified that error appears in the above-identified patent and that said Letters Patent is hereby corrected as shown below:

COLUMN 7

Dye 11), " 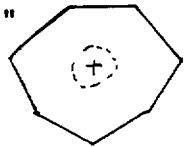 " should read -- 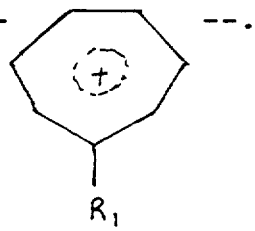 --.

COLUMN 9

Line 47, "rear" should read --rare--.
Line 67, "rear" should read --rare--.

COLUMN 10

Line 25, "rear" should read --rare--.

COLUMN 11

Line 20, "hydrophyilic" should read --hydrophilic--.

COLUMN 16

Line 52, "enumerous" should read --numerous--.

COLUMN 18

Line 11, "enumerous" should read --numerous--.
Line 33, "electro chemical" should read --electro-chemical--.

UNITED STATES PATENT AND TRADEMARK OFFICE
CERTIFICATE OF CORRECTION

PATENT NO. : 5,264,876
DATED : November 23, 1993
INVENTOR(S) : HISAAKI KAWADE, ET AL.

Page 3 of 4

It is certified that error appears in the above-identified patent and that said Letters Patent is hereby corrected as shown below:

COLUMN 19

Line 22, "recording/erazing" should read --recording/erasing--.
Line 23, "erazing" should read --erasing--.

COLUMN 20

Line 17, "electro chemical" should read --electro-chemical--.
Line 31, "electrode 5" should read --probe electrode 5--.

COLUMN 23

Line 33, "electro chemical" should read --electro-chemical--.

COLUMN 24

Line 12, "of the" should be deleted.

COLUMN 26

Line 36, "electrode" should read --electrodes--.

COLUMN 27

Line 58, "a" (second occurrence) should read --an--.
Line 59, "electrode" should read --electrodes--.

UNITED STATES PATENT AND TRADEMARK OFFICE
CERTIFICATE OF CORRECTION

PATENT NO. : 5,264,876

DATED : November 23, 1993

INVENTOR(S) : HISAAKI KAWADE, ET AL.

It is certified that error appears in the above-identified patent and that said Letters Patent is hereby corrected as shown below:

COLUMN 28

Line 23, "electrode" should read --electrodes--.

Signed and Sealed this

Ninth Day of August, 1994

Attest:

BRUCE LEHMAN

Attesting Officer  Commissioner of Patents and Trademarks